United States Patent
Mirza et al.

(10) Patent No.: US 10,649,810 B2
(45) Date of Patent: May 12, 2020

(54) DATA DRIVEN SCHEDULER ON MULTIPLE COMPUTING CORES

(71) Applicants: Advanced Micro Devices, Inc., Sunnyvale, CA (US); ATI Technologies ULC, Markham (CA)

(72) Inventors: Jimshed Mirza, Markham (CA); YunPeng Zhu, Shanghai (CN)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 0 days.

(21) Appl. No.: 14/981,257

(22) Filed: Dec. 28, 2015

(65) Prior Publication Data

US 2017/0185451 A1 Jun. 29, 2017

(51) Int. Cl.
*G06F 9/50* (2006.01)

(52) U.S. Cl.
CPC .......... *G06F 9/5016* (2013.01); *G06F 9/5027* (2013.01); *G06F 9/5066* (2013.01)

(58) Field of Classification Search
CPC .................................................... G06F 9/5016
See application file for complete search history.

(56) References Cited

U.S. PATENT DOCUMENTS

| | | | |
|---|---|---|---|
| 6,289,369 B1 * | 9/2001 | Sundaresan ............. | G06F 9/505 718/100 |
| 6,769,017 B1 * | 7/2004 | Bhat ..................... | G06F 9/5033 709/214 |
| 9,122,800 B1 | 9/2015 | Huddar et al. | |
| 2007/0079298 A1 * | 4/2007 | Tian ......................... | G06F 8/45 717/140 |
| 2007/0143759 A1 | 6/2007 | Ozgur et al. | |
| 2009/0178054 A1 | 7/2009 | Chen et al. | |
| 2011/0126200 A1 | 5/2011 | Krieger et al. | |
| 2012/0081373 A1 * | 4/2012 | Li ......................... | G06F 9/4893 345/520 |
| 2014/0189711 A1 * | 7/2014 | Luiz ........................ | G06F 9/461 718/106 |
| 2014/0317378 A1 | 10/2014 | Lippett | |
| 2015/0154054 A1 | 6/2015 | Ohno et al. | |
| 2015/0160970 A1 * | 6/2015 | Nugteren ................. | G06F 8/451 718/102 |
| 2015/0212819 A1 * | 7/2015 | Giroux .................. | G06F 9/3832 712/244 |

OTHER PUBLICATIONS

IDS cited (Nugteren et al., "A study of the potential of locality-aware thread scheduling for GPUs", Aug. 25, 2014).*

(Continued)

*Primary Examiner* — Sisley N Kim
(74) *Attorney, Agent, or Firm* — Volpe and Koenig, P.C.

(57) ABSTRACT

Methods, devices, and systems for data driven scheduling of a plurality of computing cores of a processor. A plurality of threads may be executed on the plurality of computing cores, according to a default schedule. The plurality of threads may be analyzed, based on the execution, to determine correlations among the plurality of threads. A data driven schedule may be generated based on the correlations. The plurality of threads may be executed on the plurality of computing cores according to the data driven schedule.

51 Claims, 10 Drawing Sheets

(56) References Cited

OTHER PUBLICATIONS

IDS cited (Rogers et al., "Cache-Conscious Wavefront Scheduling", 2012).*

Rogers et al. ("Cache-Conscious Wavefront Scheduling," IDS filed on Dec. 28, 2105 cited by applicant).*

Rogers et al. ("Cache-Conscious Wavefront Scheduling," IDS filed on Dec. 28, 2105 cited by applicant, hereinafter Rogers).*

Nugteren, Cedric et al., "A study of the potential of locality-aware thread scheduling for GPUs", L. Lopes, & J. Zilinskas (Eds.), Euro-Par 2014: Parallel Processing Workshops : Euro-Par 2014 International Workshops, Porto, Portugal, Aug. 25-26, 2014, Revised Selected Papers, Part II. (pp. 146-157). (Lecture Notes in Computer Science; vol. 8806). Berlin: Springer. 10.1007/978-3-319-14313-2_13.

Rogers, Timothy G. et al, "Cache-Conscious Wavefront Scheduling", In the Proceedings of the 2012 45th Annual IEEE/ACM International Symposium on Microarchitecture (MICRO-45), Dec. 1-5, 2012, pp. 72-83, IEEE Computer Society, Washington, D.C., U.S.

International Search Report and Written Opinion of International Application PCT/US2016/052710, dated Dec. 20, 2016, 12 pages.

\* cited by examiner

DATA DRIVEN SCHEDULER ON MULTIPLE COMPUTING CORES

TECHNICAL FIELD

The disclosed embodiments are generally directed to processing devices, and in particular, to memory management in processors having multiple compute units.

BACKGROUND

Many modern microprocessors combine a number of processor cores into a single processor to form a multicore processor. Multicore processors mainly provide benefit by performing parallel computing. For example, multicore processors may exploit thread-level parallelism to execute different programs, or different threads, thread groups, or waves of a single program, on different parallel cores within the processor.

Graphics processing units (GPUs) may benefit from implementation as multicore processors, as various graphics processing tasks lend themselves particularly to parallel processing. For example, three dimensional (3D) projection may fall into a category of tasks which have been referred to as "perfectly parallel" or "embarrassingly parallel".

In multicore architectures, each core may have a local memory, such as an L1 cache. However for various reasons, such as reduction of die size, several (or all) of the cores in a multicore device may share a memory, such as a shared L2 or last level (LLC) cache, other types of cache, or other levels in a cache or memory hierarchy. Sharing of a memory however may result in competition for memory resources among the cores.

SUMMARY OF EMBODIMENTS

Some embodiments provide a method for data driven scheduling of a plurality computing cores of a processor. A plurality of threads may be executed on the plurality of computing cores, according to a default schedule. The plurality of threads may be analyzed, based on the execution, to determine correlations among the plurality of threads. A data driven schedule may be generated based on the correlations. The plurality of threads may be executed on the plurality of computing cores according to the data driven schedule.

Some embodiments provide a processor configured for data-driven scheduling. The processor comprises a plurality computing cores and a memory shared by each of the computing cores. The processor comprises dispatching circuitry configured to dispatch a plurality of threads to execute on the plurality of computing cores, according to a default schedule. The processor comprises correlation circuitry configured to analyze the plurality of threads, based on the execution, to determine correlations among the plurality of threads. The processor comprises scheduling circuitry configured to determine a data driven schedule based on the correlations. The dispatching circuitry is further configured to dispatch the plurality of threads to execute on the plurality of computing cores according to the data driven schedule.

Some embodiments provide a system for memory management of a multicore processor. The system comprises a processor. The processor comprises a plurality computing cores and a memory shared by each of the computing cores. The processor comprises dispatching circuitry configured to dispatch a plurality of threads to execute on the plurality of computing cores, according to a default schedule. The processor comprises correlation circuitry configured to analyze the plurality of threads, based on the execution, to determine correlations among the plurality of threads. The processor comprises scheduling circuitry configured to determine a data driven schedule based on the correlations. The dispatching circuitry is further configured to dispatch the plurality of threads to execute on the plurality of computing cores according to the data driven schedule.

BRIEF DESCRIPTION OF THE DRAWINGS

A more detailed understanding may be had from the following description, given by way of example in conjunction with the accompanying drawings wherein.

DETAILED DESCRIPTION

Figure 1:
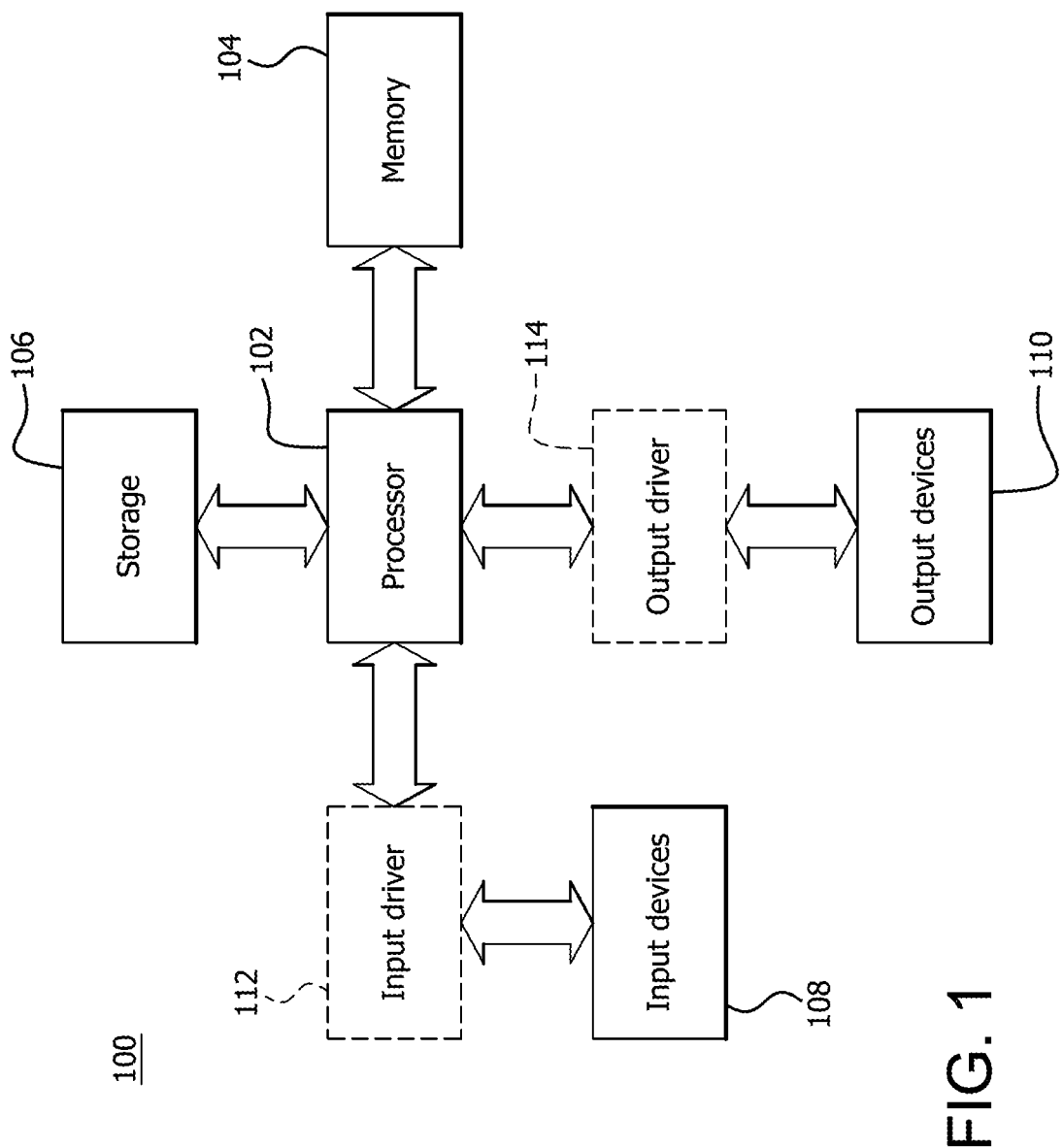
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU, or a shader engine (SE), compute unit (CU), or single-instruction-multiple-data (SIMD) unit of a CPU or GPU. The memory 104 may be located on the same die as the processor 102, or may be located separately from the processor 102. The memory 104 may include a volatile or non-volatile memory, for example, random access memory (RAM), dynamic RAM, or a cache. Each processor core may have a local memory, such as a local L1 cache memory, and/or may share a memory, such as a shared L2 cache memory, with one or more other cores.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In a multi-core processor, inefficiencies may occur where two (or more) cores sharing a cache execute threads (or thread groups, or waves, or other types of instruction groupings) in parallel (e.g., simultaneously or contemporaneously during overlapping time periods) which access substantial amounts of different information from memory. The threads may access different information due to insufficient locality of reference between the threads, for example. Locality of reference in this context may refer to the same information being referenced by each of the threads.

In such situations, it is possible that data loaded into the shared cache due to execution of one of the threads may be evicted by data loaded into the shared cache due to execution of the other thread. This may depend upon the number of memory accesses required by each thread, and/or upon whether each thread accesses information different from that accessed by the other thread. Such evictions may continue back and forth throughout the execution of the threads, and may lead to substantial and undesirable increases in memory access latency.

Accordingly, it may be desirable to organize a multicore processor to preferentially execute, where possible, those threads which use more of the same information and/or exhibit greater memory re-use in parallel on separate cores. Memory re-use in this context may refer to information retrieved from memory by one thread which is also used by another thread. In a scenario where one of these threads executes on one core and the other thread executes on another core, where the two cores share a cache, the information may be stored in the shared cache for access by both threads. Thus for threads scheduled for execution during a given time, it may be preferable to execute those threads which exhibit more shared locality of reference in parallel rather than executing other threads in parallel. This may have the advantage of reducing the number of evictions from the shared data cache and thus reducing memory access latency. For example, in a case where a number of pixels use the same texture data and are processed by a GPU having a number of processing units, it may be more efficient to process those pixels sharing the texture data in parallel instead of serially in order to take advantage of the shared locality of reference.

Figure 2:
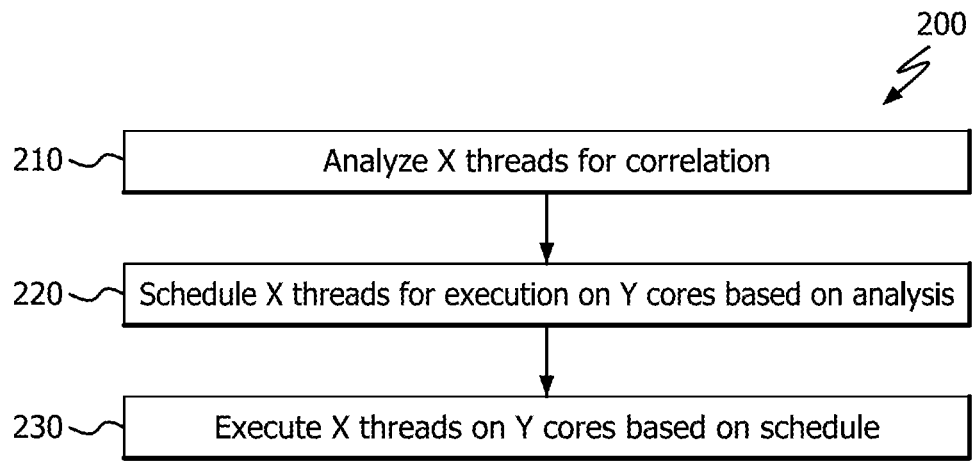
FIG. 2 is a flow chart illustrating an example method for scheduling a number of threads for execution on a number of cores of a multicore processor.

FIG. 2 is a flow chart illustrating an example method 200 for scheduling a number (X) of threads for execution on a number (Y) of cores of a multicore processor, where the Y cores share at least one memory, such as a shared L2 cache. Method 200 may be implemented, for example, using some or all of device 100. For example, the processor may correspond to processor 102 as shown in FIG. 1.

In step 210, the threads are analyzed, e.g., by an analysis module of the multicore processor, to determine the amount of memory re-use or "correlation" between or among them. For example, where X=4 and Y=2, the X threads may be analyzed to determine which pairs of threads have the greatest correlation between them. In a different example where X=8 and Y=4, the X threads may be analyzed to determine which groups of four threads have the greatest correlation among them. The correlations of these groups of threads may be ranked, e.g., by the analysis module. The analysis may be performed in any suitable manner, including those examples described further herein.

In step 220, the threads are scheduled, e.g., by a scheduling module of the multicore processor, such that the Y threads identified in step 210 as having the greatest correlation are executed in parallel on the Y cores. If X=2Y, the remaining threads of the X threads may be scheduled to be executed in parallel on the Y cores. If X>2Y, the remaining threads may be scheduled to be executed in parallel based on the greatest correlation among them.

It is noted that the threads may alternatively be scheduled such that the different sets of Y threads are scheduled for parallel execution based on a balance of correlation. For example, in a situation where executing the Y threads identified in step 210 as having the greatest correlation in parallel would leave the remaining threads to execute in parallel with a poorer correlation than a different selection of threads, then each of the Y sets of threads may be chosen such that the correlation across both sets of Y threads is maximized.

In step 230, the X threads are executed on the Y cores as scheduled in step 220. Because the X threads are executed on the Y cores in subsets which have the best available correlation, eviction from the shared memory (e.g., shared L2 cache) may be minimized, thus helping to minimize memory access latency and improve performance.

It is noted however that the method 200 may require analysis of the X threads for correlation prior to execution of these threads on the Y cores. This may not be possible, for example, where the X threads have not been programmed to take advantage of correlation-based multicore scheduling. Accordingly, it may be advantageous to determine the correlations dynamically.

Figure 3:
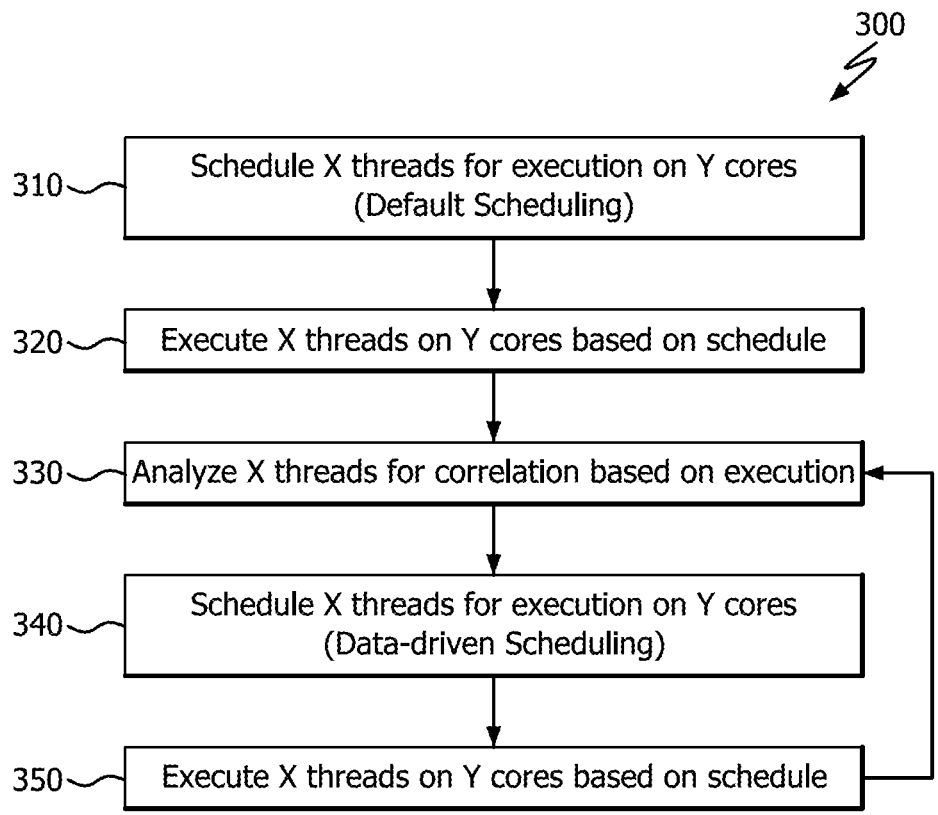
FIG. 3 is a flow chart illustrating another example method for scheduling a number of threads for execution on a number of cores of a multicore processor.

FIG. 3 is a flow chart illustrating another example method 300 for scheduling X threads for execution on Y cores of a multicore processor, where the Y cores share at least one memory, such as a shared L2 cache. In method 300, the correlation is determined dynamically. Method 300 may be implemented, for example, using some or all of device 100. For example, the processor may correspond to processor 102 as shown in FIG. 1.

In step 310, the X threads are scheduled for execution on the Y cores. At this step, correlations among the X threads are unknown. Accordingly, a default scheduling pattern, such as a "round-robin" pattern is used initially. Thus in an example where X=4 and the threads are T0, T1, T2, and T3, and where Y=2 and the cores are CU0 and CU1, the scheduling in round-robin fashion would be T0=C0, T1=C1, T2=C0, T3=C1.

In step 320, the X threads are executed on the Y cores according to their current scheduling. Thus if the scheduling follows the round-robin pattern of step 310, threads T0 and T1 would execute in parallel on C0 and C1 respectively, followed by the execution of T2 and T3 on C0 and C1 respectively.

In step 330, the X threads are analyzed for correlation based on the execution. The analysis of step 330 may actually occur in combination with step 320 during the execution, or may be performed on data gathered during step 320 after execution. The correlations may be determined using any suitable technique, and examples are discussed further herein.

In step 340, the X threads are scheduled for execution on the Y cores based on the correlations determined in step 330. At this step, correlations among the X threads are known. Accordingly, the default scheduling pattern is not used; rather, the threads are scheduled according to the known correlations. In an example where X=4 and the threads are T0, T1, T2, and T3, and where Y=2 and the cores are CU0 and CU1, it may be determined in step 330 that the highest correlation value among the various possible pairs of threads is between T0 and T2. The scheduling based on correlation then would be T0=C0, T2=C1, T1=C0, T3=C1. Because this scheduling is based on correlation data produced by the analysis of step 330, such scheduling may be referred to as data-driven scheduling, and a device or combination of devices for implementing such scheduling may be referred to as a data-driven scheduler.

The data-driven scheduling may alternatively be based on correlation maximized across the execution of all threads. For example, if the correlation between T1 and T3 is especially low, execution of these threads in parallel in the schedule T0=C0, T2=C1, T1=C0, T3=C1 may result in a memory access latency which offsets or negates the reduction in memory access latency provided by executing T0 and T2 in parallel. To address this, the second highest correlation value (or third, or fourth, etc.) among the various possible pairs of threads may be considered by the data-driven scheduler. In an example, this second highest correlation may be between T0 and T3. Using this pair for scheduling execution would yield T0=C0, T3=C1, T1=C0, T2=C1. In an example where a poor correlation between T1 and T3 offsets the highest correlation between T0 and T2, this new schedule may minimize memory access latency across execution of all X threads. It is noted that this schedule may itself not offer the highest average correlation across all threads, and it is noted that all possible combinations may be analyzed to determine the best average correlation and/or minimized memory access latency across all threads. A data-driven scheduler configured to maximize correlation among all X threads in this way may however require additional circuitry and/or additional delay to implement.

In step 350, the X threads are executed on the Y cores according to the schedule. Thus if the scheduling follows T0=C0, T2=C1, T1=C0, T3=C1, threads T0 and T2 would execute in parallel on C0 and C1 respectively, followed by the execution of T1 and T3 on C0 and C1 respectively.

The flow may return to step 330 for further analysis of the executing threads; e.g., between memory accesses of the executing threads. This may allow for further dynamic control over the execution scheduling. For example, in some implementations, the scheduling may be adjusted during execution of the threads (e.g., where indicated by changing correlation values) by context-saving the currently executing threads, scheduling the threads to different cores based upon the updated schedule, and then restoring the context.

Figure 4:
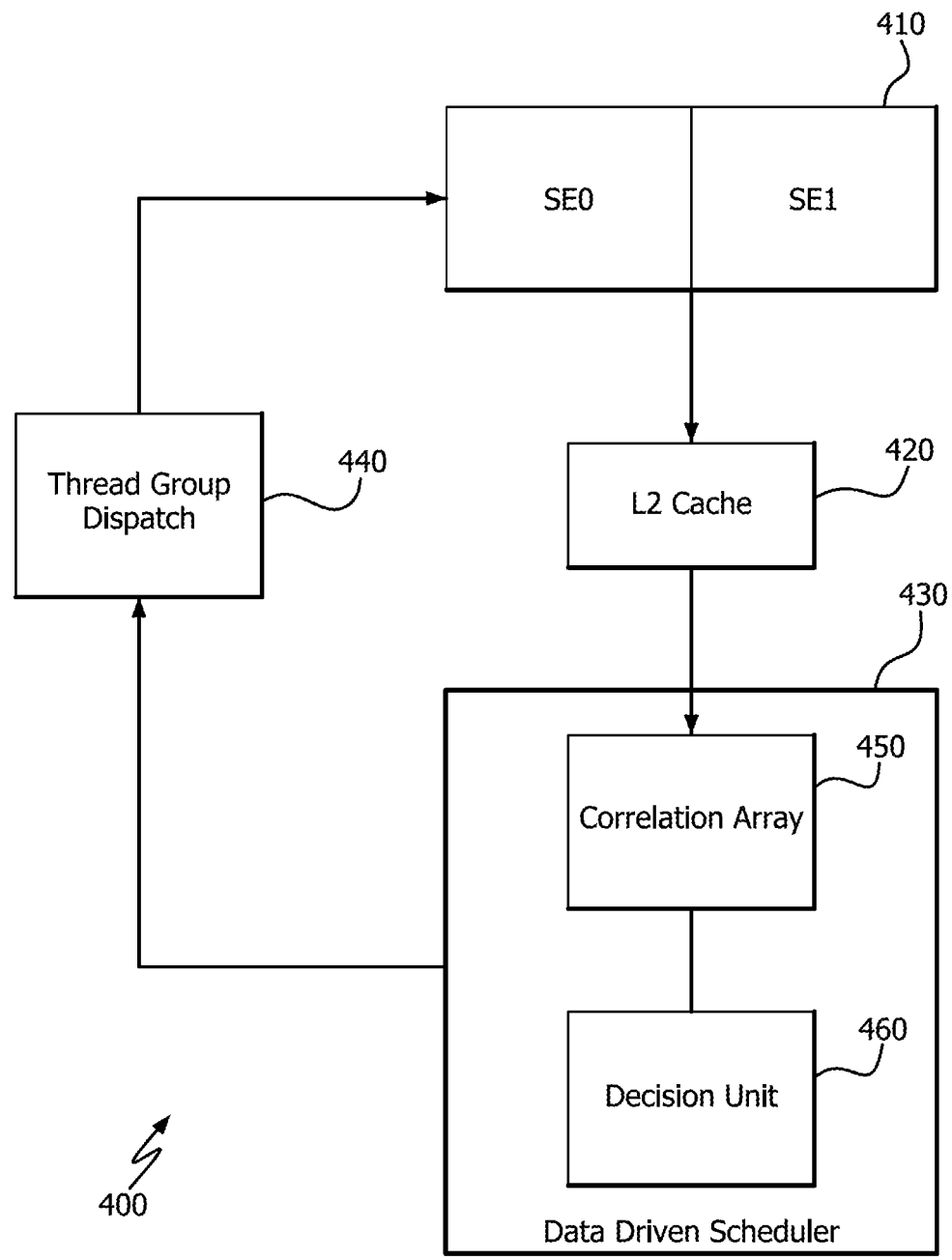
FIG. 4 is a block diagram illustrating an example system which implements data driven scheduling.

FIG. 4 is a block diagram illustrating an example system 400 which implements data driven scheduling. In one example implementation, system 400 may be a feature of processor 102. System 400 includes processing units 410, a cache memory 420 shared by processing units 410, a data driven scheduler 430, and a thread group dispatcher 440. In the example of system 400, processing units 410 include two cores, in this case, shader engines SE0 and SE1. Data driven scheduler 430 includes a correlation array 450 and a decision unit 460, and determines schedules on the thread group level. A group of threads which are grouped for execution in parallel on a shader engine may be referred to as a thread group in this context.

Shader engines SE0 and SE1 may include a cluster of processing units within a graphics processor, for example. It is noted that such clusters may be referred to by terms other than "shader engine" in various architectures.

Cache memory 420, in this example, is an L2 cache; however it is noted that cache memory 420 may be any suitable level of cache memory, or another shared memory, shared by shader engines SE0 and SE1. Cache memory 420 is shared by shader engines SE0 and SE1.

Data driven scheduler 430 schedules thread groups for execution on the processing units 410. Correlation array 450 calculates a correlation between or among thread groups. Decision unit 460 determines which thread group to dispatch to a particular one of processing units 410 at a particular time.

Before correlation data is available for scheduling, data driven scheduler 430 schedules thread groups for execution on shader engines SE0 and SE1 using a default (e.g., non-data-driven) scheduling pattern. This default pattern may be a round-robin pattern. In the example system 400, scheduling is performed at a granularity of 4 thread groups. Thus where the first four thread groups are referred to as TG0, TG1, TG2, and TG3, scheduling for the first 4 thread groups in round-robin fashion would be TG0=SE0, TG1=SE1, TG2=SE0, TG3=SE1. Thread group dispatcher 440 then dispatches the thread groups for execution on SE0 and SE1 according to the default schedule.

Upon a new memory request from SE0 and/or SE1 to cache 420, cache 420 may forward an index and a cache tag, which correspond to the memory request, to correlation array 450. The index may correspond to the identity of the requesting thread group, e.g., a TG ID, and the tag may include the requested memory address, a data mask, and/or auxiliary information. Thus the cache 420 provides the correlation array 450 with information regarding what memory accesses the currently executing thread group requires. If the correlation array 450 is implemented in a physical address space, for example, the address of the physical memory being accessed to a cacheline granularity may be adequate correlation information. If the correlation array 450 is implemented in a virtual address space, additional information, such as some form of process ID, may be required.

Correlation array 450 may store the index and tag information, and may use this information to calculate correlation values for the thread groups, as further discussed below. Correlation array 450 may report these correlation values to the decision unit 460. Decision unit 460 may use the reported correlation values to determine a data-driven scheduling for execution of the thread groups TG0, TG1, TG2, TG3, on SE0 and SE1. Thread group dispatcher 440 may then dispatch the thread groups for execution on SE0 and SE1 according to the data-driven schedule.

Figure 5:
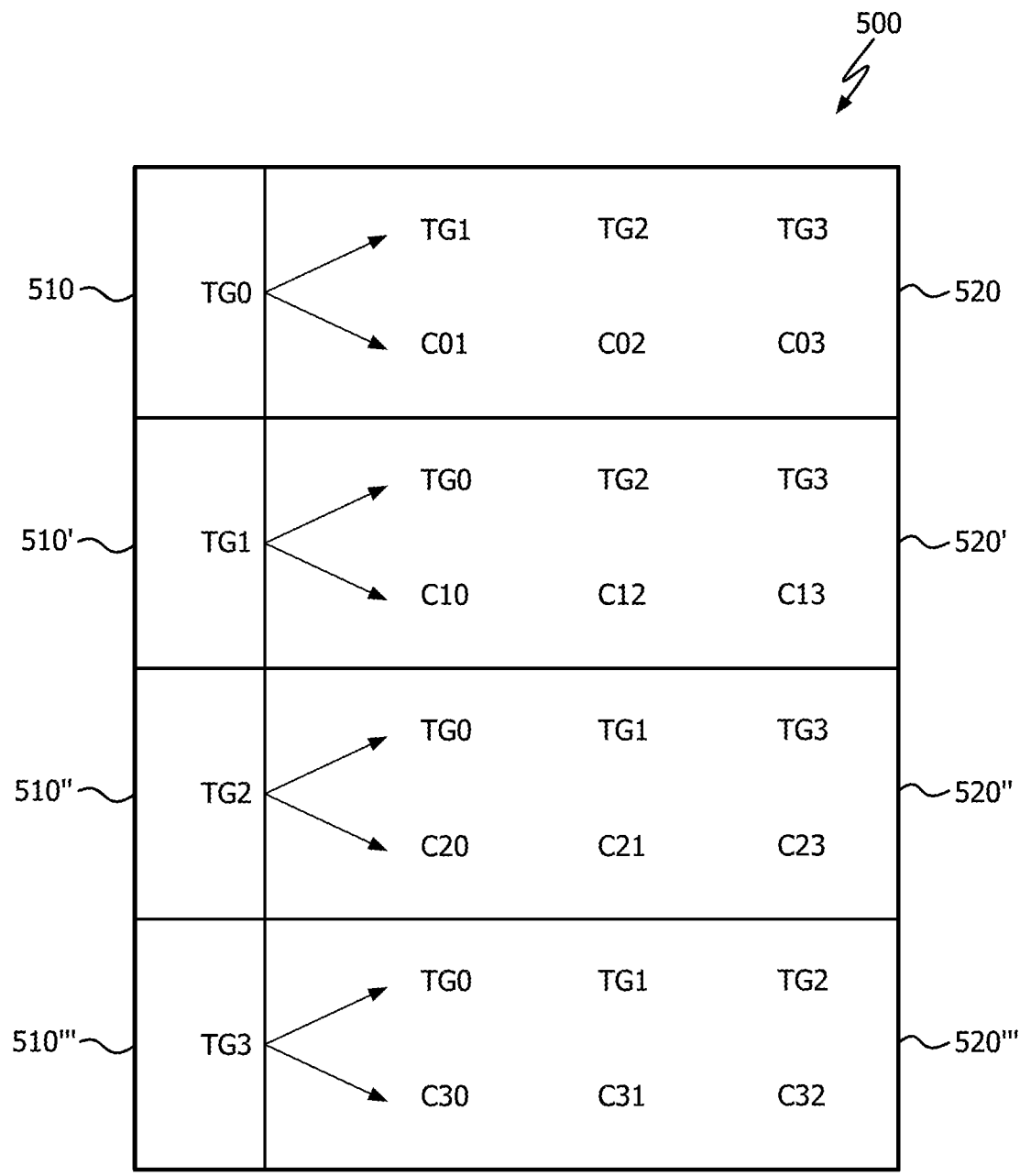
FIG. 5 is a table which illustrates an example state of a correlation array.

FIG. 5 is a table 500 which illustrates an example state of correlation array 450 at a certain point during the execution of thread groups TG0, TG1, TG2, and TG3. The example system 400 performs scheduling at a granularity of 4 thread groups. Accordingly, table 500 includes 4 keys 510, 510', 510", 510''', which each correspond to one of thread groups TG0, TG1, TG2, and TG3.

Each key 510, 510', 510", 510''' includes a corresponding tag list (not shown) and set of contributing correlation values 520, 520', 520", 520'''. The sets of contributing correlation values 520, 520', 520", 520''' reflect a correlation of each pair of thread groups TG0, TG1, TG2, and TG3. For example, key 510 stores the set of contributing correlation values 520 for TG0. The set of contributing correlation values 520 stores a contributing correlation value C01 corresponding to the correlation between TG0 and TG1, a contributing correlation value C02 corresponding to the correlation between TG0 and TG2, and a contributing correlation value C03, corresponding to the correlation between TG0 and TG3. Each of the other keys 510', 510", 510''' stores a similar set of contributing correlation values 520', 510", 520''' as reflected in FIG. 5. Before correlation information is available to correlation array 450 (e.g., similar to step 310 of method 300), the tag list may be empty and the contributing correlation values may be zero.

On a new memory request by SE0 or SE1 during execution of a thread group, the correlation array 450 receives the corresponding index and tag information of the memory request from the cache. If the index and tag information matches an entry in table 500, the corresponding contributing correlation value may be incremented, increased, or otherwise altered to reflect the increased correlation. For example, if correlation array 450 receives index TG1 and a tag tag3, and if correlation array 450 reflects that the tag list of TG0 also includes tag3, then the contributing correlation value C01, which reflects the correlation between TG0 and TG1, may be increased (e.g., incremented by one).

If the received index matches a key in table 500, but the received tag does not match any tags in the tag list, the received tag may be inserted into the tag list for that key. If the received index does not match a key in table 500, but the received tag does match a tag in the tag list . . . .

After TG0, TG1, TG2, and TG3 have finished execution on SE0 and SE1, contributing correlation values C01 and C10 may be summed (or otherwise combined) to determine a correlation value c01 reflecting the correlation between TG0 and TG1. Other matching contributing correlation values may also be summed similarly to find correlation values for other TG pairs. For example, c02 may be a correlation value for TG0 and TG2, calculated by summing contributing correlation values C02 and C20, and so forth. These correlation values c01, c02, c03, c12, c13, c23 may be reported to decision unit 460.

It is noted that rather than waiting until TG0, TG1, TG2, and TG3 have finished execution on SE0 and SE1, the contributing correlation values may be summed and/or reported after a certain interval, e.g., 1,000 processor clock cycles. Thus, the correlation values may be calculated prior to the completion of execution, or after several executions of TG0, TG1, TG2, and TG3. This may permit dynamic scheduling and/or scheduling based on higher resolution data.

Returning to FIG. 4, the decision unit 460 may determine the issuing order (i.e., the data-driven schedule) of the next four TGs TG0, TG1, TG2, TG3 based on the reported correlation values c01, c02, c03 . . . . Table 1 shows pseudo code reflecting an example of a partial algorithm for decision unit 460 to make this determination. Thread group dispatcher 440 receives the data-driven schedule from the decision unit 460, and dispatches the thread groups to SE0 and SE1 according to the data-driven schedule. In some implementations, thread group dispatcher 440 may only update its schedule on a determination that the schedule has changed. In some implementations, on a condition that the schedule has changed, the thread groups currently running on SE0 and SE1 may be preempted and the context may be saved, the updated schedule may be applied to the thread groups (i.e., thread groups may be reassigned to different shader engines and/or execution times), the context may be restored, and execution may resume under the updated schedule.

TABLE 1

```
If(max{c01, c02, c03, ...} == c01)
{
    group the next TG0 and TG2 to SE0;
    group the next TG1 and TG3 to SE1;
}
else if(max{c01, c02, c03, ...} == c02)
{
    group the next TG0 and TG1 to SE0;
    group the next TG2 and TG3 to SE1;
}
else if(max{c01, c02, c03, ...} == c03)
{
    group the next TG0 and TG1 to SE0;
    group the next TG3 and TG2 to SE1;
}
...
```

In other example systems, scheduling may be on a basis other than thread group. For example, scheduling based on wave level may be appropriate depending upon the system architecture.

Figure 6:
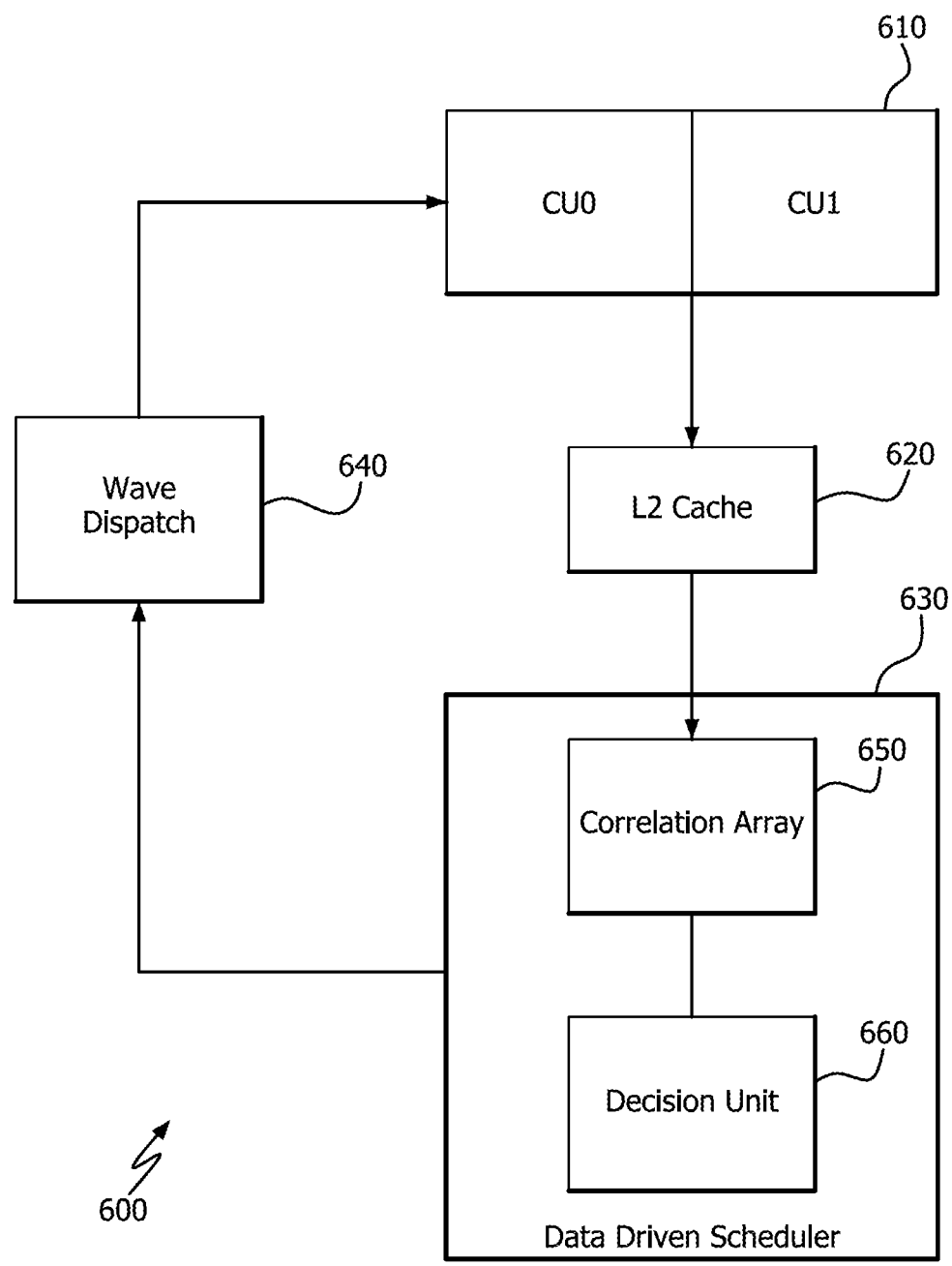
FIG. 6 is a block diagram illustrating another example system which implements data driven scheduling.

FIG. 6 is a block diagram illustrating an example system 600 which implements data driven scheduling. In one example implementation, system 600 may be a feature of processor 102. System 600 includes processing units 610, a cache memory 620 shared by processing units 610, a data driven scheduler 630, and a wave dispatcher 640. In the example of system 600, processing units 610 include two cores, in this case, compute units CU0 and CU1. Data driven scheduler 630 includes a correlation array 650 and a decision unit 660, and determines schedules on the wave level.

Compute units CU0 and CU1 each may include a single-instruction multiple data (SIMD) core. A group of threads which execute in parallel on a SIMD core may be referred to as a wave in this context.

Cache memory 620, in this example, is an L2 cache, however it is noted that cache memory 620 may be any suitable level of cache memory, or another shared memory, shared by compute units CU0 and CU1. Cache memory 620 is shared by compute units CU0 and CU1.

Data driven scheduler 630 schedules waves for execution on the processing units 610. Correlation array 650 calculates a correlation between or among waves. Decision unit 660 determines which wave to dispatch to a particular one of processing units 610 at a particular time.

Before correlation data is available for scheduling, data driven scheduler 630 schedules thread groups for execution on compute units CU0 and CU1 using a default (e.g., non-data-driven) scheduling pattern. This default pattern may be a round-robin pattern. In the example system 600, scheduling is performed at a granularity of 4 waves. Thus where the first four waves are referred to as wave0, wave1, wave2, and wave3, scheduling for the first 4 waves in round-robin fashion would be wave0=CU0, wave1=CU1, wave2=CU0, wave3=CU1. Wave dispatcher 640 then dispatches the waves for execution on CU0 and CU1 according to the default schedule.

Upon a new memory request from CU0 and/or CU1 to cache 620, cache 620 may forward an index and a cache tag, which correspond to the memory request, to correlation array 650. The index may correspond to the identity of the requesting wave, e.g., a wave ID, and the tag may include the requested memory address, a data mask, and/or auxiliary information. Thus the cache 620 provides the correlation array 650 with information regarding what memory accesses the currently executing wave requires. A tag may be a physical address, or a virtual address in combination with a virtual memory identifier. The tag may be similar to the tag used in the data cache.

Correlation array 650 may store the index and tag information, and may use this information to calculate correlation values for the waves, as further discussed below. Correlation array 650 may report these correlation values to the decision unit 660. Decision unit 660 may use the reported correlation values to determine a data-driven scheduling for execution of the waves wave0, wave1, wave2, wave3, on CU0 and CU1. Wave dispatcher 640 may then dispatch the waves for execution on CU0 and CU1 according to the data-driven schedule.

Figure 7:
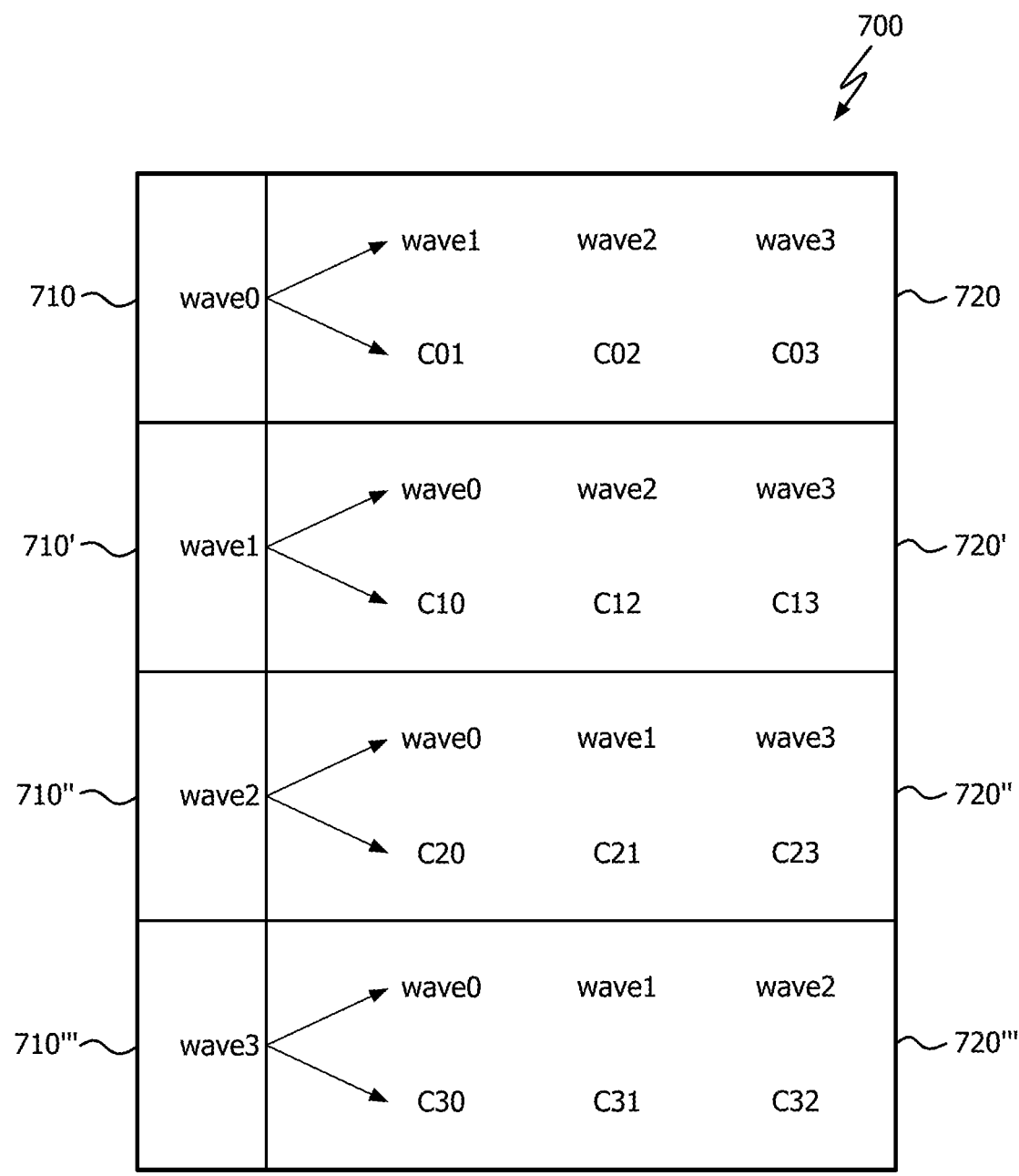
FIG. 7 is a table which illustrates another example state of a correlation array.

FIG. 7 is a table 700 which illustrates an example state of correlation array 650 at a certain point during the execution of waves wave0, wave1, wave2, and wave3. The example system 600 performs scheduling at a granularity of 4 waves. Accordingly, table 700 includes 4 keys 710, 710', 710", 710''', which each correspond to one of waves wave0, wave1, wave2, and wave3.

Each key 710, 710', 710", 710''' includes a corresponding tag list (not shown) and set of contributing correlation values 720, 720', 720", 720'''. The sets of contributing correlation values 720, 720', 720", 720''' reflect a correlation of each pair of waves wave0, wave1, wave2, and wave3. For example, key 710 stores the set of contributing correlation values 720 for wave0. The set of contributing correlation values 720 stores a contributing correlation value C01 corresponding to the correlation between wave0 and wave1, a contributing correlation value C02 corresponding to the correlation between wave0 and wave2, and a contributing correlation value C03, corresponding to the correlation between wave0 and wave3. Each of the other keys 710', 710", 710''' stores a similar set of contributing correlation values 720', 710", 720''' as reflected in FIG. 7. Before correlation information is available to correlation array 650 (e.g., similar to step 310 of method 300), the tag list may be empty and the contributing correlation values may be zero.

On a new memory request by CU0 or CU1 during execution of a wave, the correlation array 650 receives the corresponding index and tag information of the memory request from the cache. If the index and tag information matches an entry in table 700, the corresponding contributing correlation value may be incremented, increased, or otherwise altered to reflect the increased correlation. For example, if correlation array 650 receives index wave1 and a tag tag3, and if correlation array 650 reflects that the tag list of wave0 also includes tag3, then the contributing correlation value C01, which reflects the correlation between wave0 and wave1, may be increased (e.g., incremented by one).

If the received index matches a key in table 700, but the received tag does not match any tags in the tag list, the received tag may be inserted into the tag list for that key. If the received index does not match a key in table 700, but the received tag does match a tag in the tag list a new key may be added for that index and the correlations for the other keys would be adjusted if the tag matches.

After wave0, wave1, wave2, and wave3 have finished execution on CU0 and CU1, contributing correlation values C01 and C10 may be summed (or otherwise combined) to determine a correlation value c01 reflecting the correlation between wave0 and wave1. Other matching contributing correlation values may also be summed similarly to find correlation values for other wave pairs. For example, c02 may be a correlation value for wave0 and wave2, calculated by summing contributing correlation values C02 and C20, and so forth. These correlation values c01, c02, c03, c12, c13, c23 may be reported to decision unit 660.

It is noted that rather than waiting until wave0, wave1, wave2, and wave3 have finished execution on CU0 and CU1, the contributing correlation values may be summed and/or reported after a certain interval, e.g., 1,000 processor clock cycles. Thus, the correlation values may be calculated prior to the completion of execution, or after several executions of wave0, wave1, wave2, and wave3. This may permit dynamic scheduling and/or scheduling based on higher resolution data.

Returning to FIG. 6, the decision unit 660 may determine the issuing order (i.e., the data-driven schedule) of the next four waves wave0, wave1, wave2, wave3 based on the reported correlation values c01, c02, c03 . . . . Table 2 shows pseudo code reflecting an example of a partial algorithm for decision unit 660 to make this determination. Wave dispatcher 640 receives the data-driven schedule from the decision unit 660, and dispatches the waves to CU0 and CU1 according to the data-driven schedule. In some implementations, wave dispatcher 640 may only update its schedule on a determination that the schedule has changed. In some implementations, on a condition that the schedule has changed, the waves currently running on CU0 and CU1 may be preempted and the context may be saved, the updated schedule may be applied to the waves (i.e., waves may be reassigned to different compute units and/or execution times), the context may be restored, and execution may resume under the updated schedule.

TABLE 2

If(max{c01, c02, c03, ...} == c01)
{
    group the next wave0 and wave2 to CU0;
    group the next wave1 and wave3 to CU1;
}
else if(max{c01, c02, c03, ...} == c02)
{
    group the next wave0 and wave1 to CU0;
    group the next wave2 and wave3 to CU1;
}
else if(max{c01, c02, c03, ...} == c03)
{
    group the next wave0 and wave1 to CU0;
    group the next wave3 and wave2 to CU1;
}
...

In other example systems, scheduling may be on a basis other than thread group or wave. For example, scheduling based on the thread level may be appropriate depending upon the system architecture. It is noted that the techniques described herein may be applied at other levels of abstraction besides thread, thread group, or wave, without departing from the invention.

Figure 8:
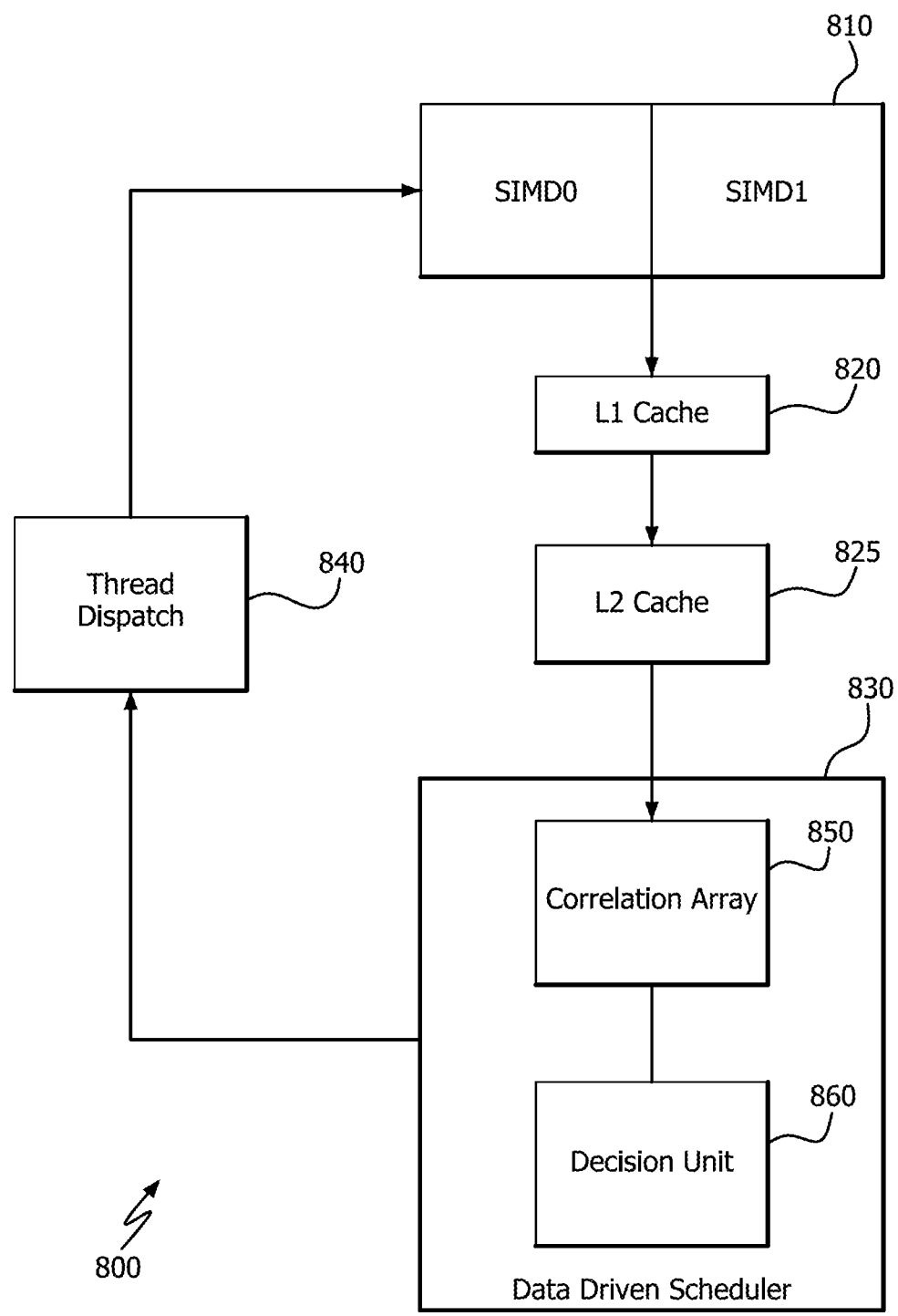
FIG. 8 is a block diagram illustrating another example system which implements data driven scheduling.

FIG. 8 is a block diagram illustrating an example system 800 which implements data driven scheduling. In one example implementation, system 800 may be a feature of processor 102. System 800 includes processing units 810, two cache memories 820 and 825, both shared by processing units 810, a data driven scheduler 830, and a thread dispatcher 840. In the example of system 800, processing units 810 include two cores, in this case, SIMD units SIMD0 and SIMD1. Data driven scheduler 830 includes a correlation array 850 and a decision unit 860, and determines schedules on the thread level.

Cache memories 820 and 825, in this example, are an L1 and L2 cache respectively. It is noted however that cache memories 820 and 825 may be any suitable levels of cache memory, or other shared memories, shared by SIMD units SIMD0 and SIMD1. Cache memories 820 and 825 are shared by SIMD units SIMD0 and SIMD1.

Data driven scheduler 830 schedules threads for execution on the processing units 810. Correlation array 850 calculates a correlation between or among threads. Decision unit 860 determines which thread to dispatch to a particular one of processing units 810 at a particular time.

Before correlation data is available for scheduling, data driven scheduler 830 schedules thread groups for execution on SIMD units SIMD0 and SIMD1 using a default (e.g., non-data-driven) scheduling pattern. This default pattern may be a round-robin pattern. In the example system 800, scheduling is performed at a granularity of 4 threads. Thus where the first four threads are referred to as thread0, thread1, thread2, and thread3, scheduling for the first 4 threads in round-robin fashion would be thread0=SIMD0, thread1=SIMD1, thread2=SIMD0, thread3=SIMD1. Thread dispatcher 840 then dispatches the threads for execution on SIMD0 and SIMD1 according to the default schedule.

Upon a new memory request from SIMD0 and/or SIMD1 to cache 820 or cache 825, the cache receiving the request may forward an index and a cache tag, which correspond to the memory request, to correlation array 850. The index may correspond to the identity of the requesting thread, e.g., a thread ID, and the tag may include the requested memory address, a data mask, and/or auxiliary information. Thus the cache 820 or 825 provides the correlation array 850 with information regarding what memory accesses the currently executing thread requires. The tag may be similar to the tag used in the data cache. A tag may be a physical address, or a virtual address in combination with a virtual memory identifier, for example.

Correlation array 850 may store the index and tag information, and may use this information to calculate correlation values for the threads, as further discussed below. Correlation array 850 may report these correlation values to the decision unit 860. Decision unit 860 may use the reported correlation values to determine a data-driven scheduling for execution of the threads thread0, thread1, thread2, thread3, on SIMD0 and SIMD1. Thread dispatcher 840 may then dispatch the threads for execution on SIMD0 and SIMD1 according to the data-driven schedule.

Figure 9:
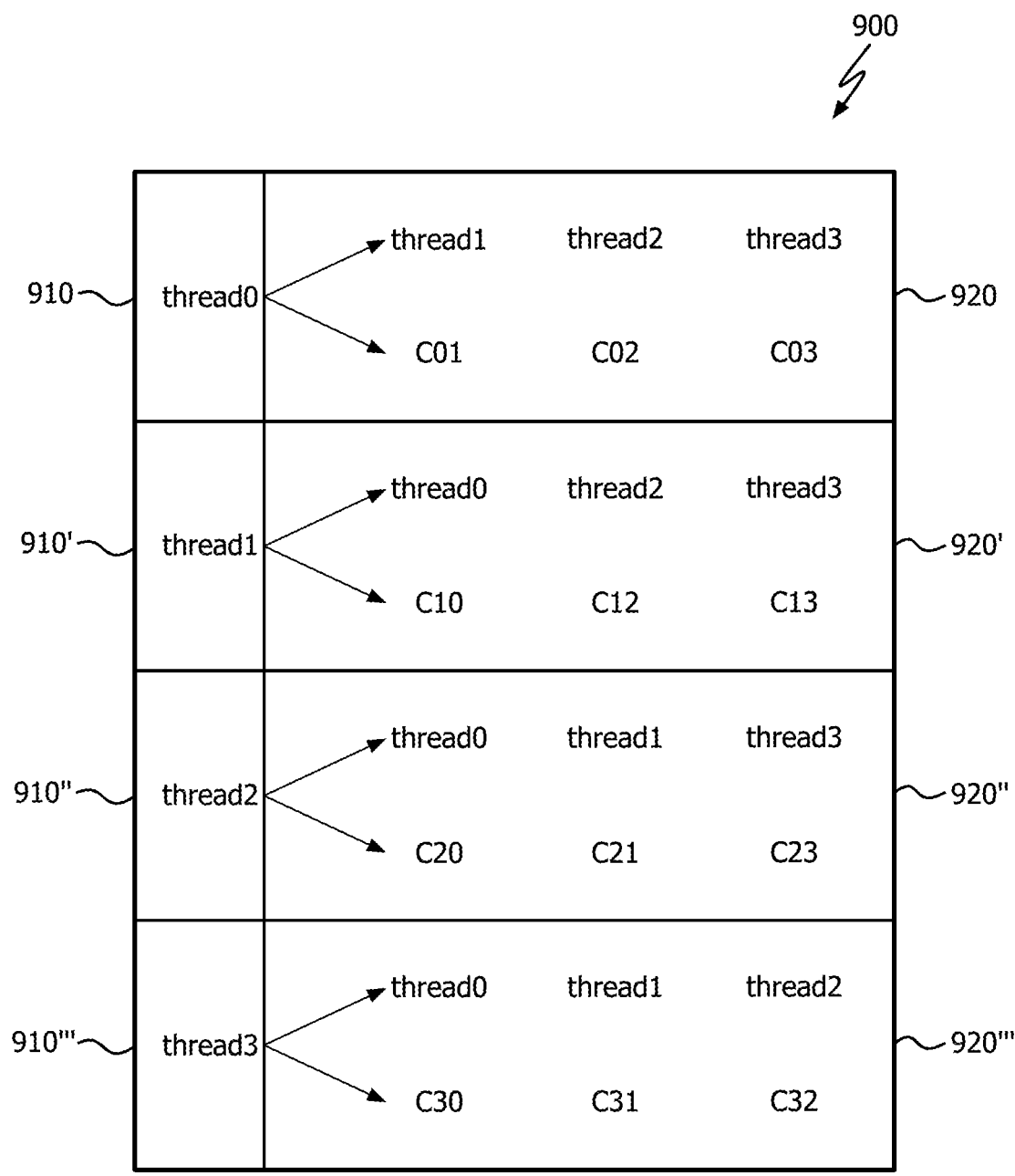
FIG. 9 is a table which illustrates another example state of a correlation array.

FIG. 9 is a table 900 which illustrates an example state of correlation array 650 at a certain point during the execution of threads thread0, thread1, thread2, and thread3. The example system 800 performs scheduling at a granularity of 4 threads. Accordingly, table 900 includes 4 keys 910, 910', 910", 910'", which each correspond to one of threads thread0, thread1, thread2, and thread3.

Each key 910, 910', 910", 910'" includes a corresponding tag list (not shown) and set of contributing correlation values 920, 920', 920", 920'". The sets of contributing correlation values 920, 920', 920", 920'" reflect a correlation of each pair of threads thread0, thread1, thread2, and thread3. For example, key 910 stores the set of contributing correlation values 920 for thread0. The set of contributing correlation values 920 stores a contributing correlation value C01 corresponding to the correlation between thread0 and thread1, a contributing correlation value C02 corresponding to the correlation between thread0 and thread2, and a contributing correlation value C03, corresponding to the correlation between thread0 and thread3. Each of the other keys 910', 910", 910'" stores a similar set of contributing correlation values 920', 910", 920'" as reflected in FIG. 9. Before correlation information is available to correlation array 850 (e.g., similar to step 310 of method 300), the tag list may be empty and the contributing correlation values may be zero.

On a new memory request by SIMD0 or SIMD1 during execution of a thread, the correlation array 850 receives the corresponding index and tag information of the memory request from the cache. If the index and tag information matches an entry in table 900, the corresponding contributing correlation value may be incremented, increased, or otherwise altered to reflect the increased correlation. For example, if correlation array 850 receives index thread1 and a tag tag3, and if correlation array 850 reflects that the tag list of thread0 also includes tag3, then the contributing correlation value C01, which reflects the correlation between thread0 and thread1, may be increased (e.g., incremented by one).

If the received index matches a key in table 900, but the received tag does not match any tags in the tag list, the received tag may be inserted into the tag list for that key. If the received index does not match a key in table 900, but the received tag does match a tag in the tag list a new key may be added for that index and the correlations for the other keys may be adjusted if the tag matches.

After thread0, thread1, thread2, and thread3 have finished execution on SIMD0 and SIMD1, contributing correlation values C01 and C10 may be summed (or otherwise combined) to determine a correlation value c01 reflecting the correlation between thread0 and thread1. Other matching contributing correlation values may also be summed similarly to find correlation values for other thread pairs. For example, c02 may be a correlation value for thread0 and thread2, calculated by summing contributing correlation values C02 and C20, and so forth. These correlation values c01, c02, c03, c12, c13, c23 may be reported to decision unit 660.

It is noted that rather than waiting until thread0, thread1, thread2, and thread3 have finished execution on SIMD0 and SIMD1, the contributing correlation values may be summed and/or reported after a certain interval, e.g., 1,000 processor clock cycles. Thus, the correlation values may be calculated prior to the completion of execution, or after several executions of threads thread0, thread1, thread2, and thread3. This may permit dynamic scheduling and/or scheduling based on higher resolution data.

Returning to FIG. 8, the decision unit 860 may determine the issuing order (i.e., the data-driven schedule) of the next four threads thread0, thread1, thread2, and thread3 based on the reported correlation values c01, c02, c03 . . . . Table 3 shows pseudo code reflecting an example of a partial algorithm for decision unit 860 to make this determination. Thread dispatcher 840 receives the data-driven schedule from the decision unit 860, and dispatches the threads to CU0 and CU1 according to the data-driven schedule. In some implementations, thread dispatcher 840 may only update its schedule on a determination that the schedule has changed. In some implementations, on a condition that the schedule has changed, the threads currently running on SIMD0 and SIMD1 may be preempted and the context may be saved, the updated schedule may be applied to the threads (i.e., threads may be reassigned to different SIMDs and/or execution times), the context may be restored, and execution may resume under the updated schedule.

TABLE 3

```
If(max{c01, c02, c03, ...} == c01)
{
    group the next thread0 and thread2 to SIMD0;
    group the next thread1 and thread3 to SIMD1;
}
else if(max{c01, c02, c03, ...} == c02)
{
    group the next thread0 and thread1 to SIMD0;
    group the next thread2 and thread3 to SIMD1;
}
else if(max{c01, c02, c03, ...} == c03)
{
    group the next thread0 and thread1 to SIMD0;
    group the next thread3 and thread2 to CU1;
}
...
```

Figure 10:
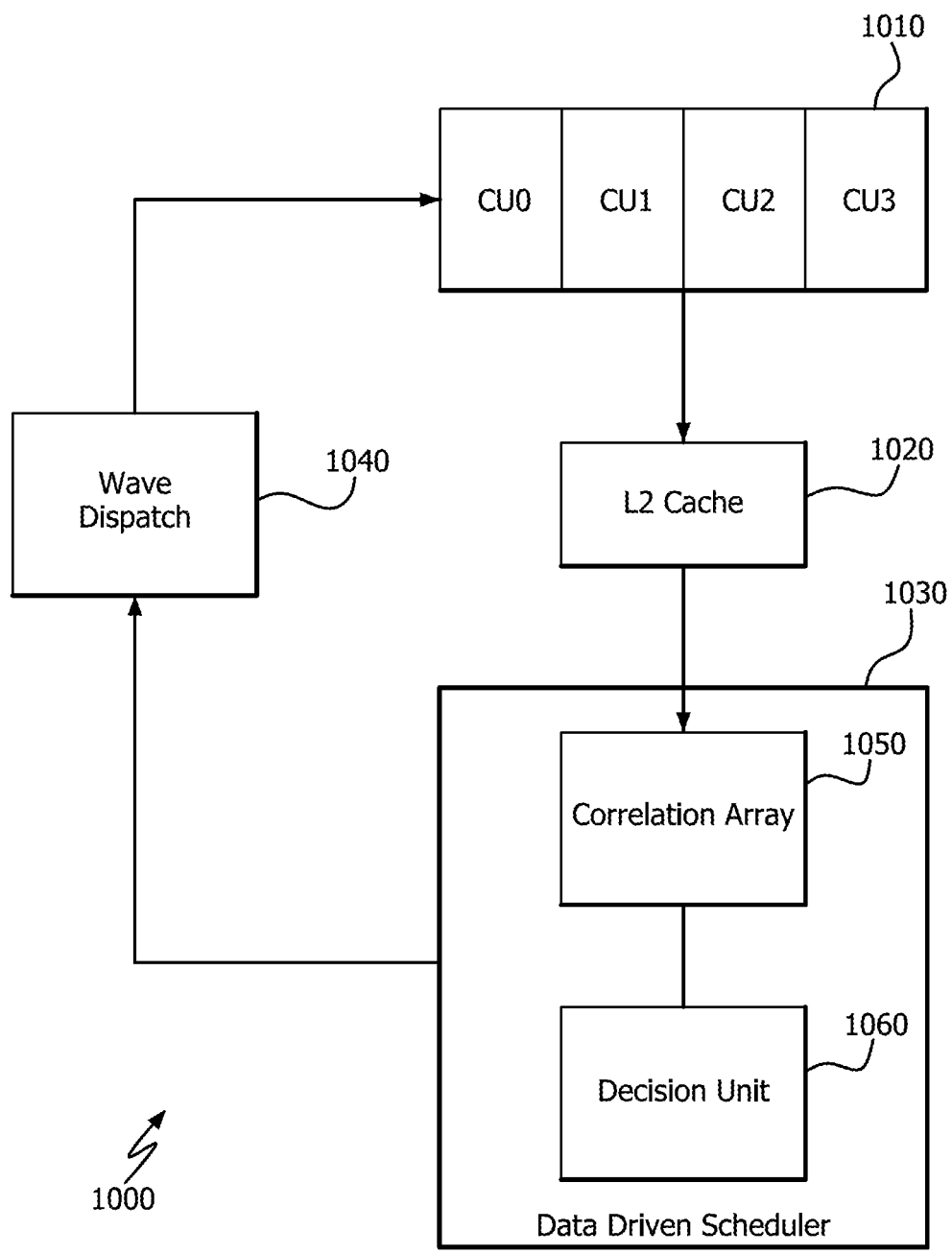
FIG. 10 is a block diagram illustrating another example system which implements data driven scheduling.

FIG. 10 is a block diagram illustrating an example system 1000 which implements data driven scheduling. In one example implementation, system 1000 may be a feature of processor 102. System 1000 includes processing units 1010, cache memory 1020, which is shared by processing units 1010, a data driven scheduler 1030, and a thread dispatcher 1040. In the example of system 1000, processing units 1010 include four cores, in this case, compute units CU0, CU1, CU2, and CU3. Data driven scheduler 1030 includes a correlation array 1050 and a decision unit 1060, and determines schedules on the thread dispatcher level.

Cache memory 1020, in this example, is an L2 cache. It is noted however that cache memory 820 may be any suitable level of cache memory, or other shared memory, shared by compute units CU0, CU1, CU2, and CU3. Cache memory 1020 is shared by compute units CU0, CU1, CU2, and CU3.

Data driven scheduler 1030 schedules waves for execution on the processing units 1010. Correlation array 1050 calculates a correlation between or among waves. Decision unit 1060 determines which wave to dispatch to a particular one of processing units 1010 at a particular time.

Before correlation data is available for scheduling, data driven scheduler 1030 schedules waves for execution on compute units CU0, CU1, CU2, and CU3 using a default (e.g., non-data-driven) scheduling pattern. This default pattern may be a round-robin pattern. In the example system 1000, scheduling is performed at a granularity of 8 waves. Thus where the first eight threads are referred to as wave0, wave1, wave2, wave3, wave4, wave5, wave6, and wave7 scheduling for the first 8 waves in round-robin fashion would be wave0=CU0, wave1=CU1, wave2=CU2, wave3=CU3 wave4=CU0, wave5=CU1, wave6=CU2, wave7=CU3. Thread dispatcher 1040 then dispatches the waves for execution on CU0, CU1, CU2, and CU3 according to the default schedule.

Upon a new memory request from CU0, CU1, CU2, and/or CU3 to cache 1020, cache 1020 may forward an index and a cache tag, which correspond to the memory request, to correlation array 1050. The index may correspond to the identity of the requesting wave, e.g., a wave ID, and the tag may include the requested memory address, a data mask, and/or auxiliary information. Thus the cache 1020 provides the correlation array 1050 with information regarding what memory accesses the currently executing wave requires. A tag may be a physical address, or a virtual address in combination with a virtual memory identifier.

Correlation array 1050 may store the index and tag information, and may use this information to calculate correlation values for the waves. Correlation array 1050 may report these correlation values to the decision unit 1060. Decision unit 1060 may use the reported correlation values to determine a data-driven scheduling for execution of the waves wave0, wave1, wave2, wave3, wave4, wave5, wave6, and wave7, on CU0, CU1, CU2, and CU3. Wave dispatcher 1040 may then dispatch the waves for execution on CU0, CU1, CU2, and CU3 according to the data-driven schedule.

Figure 11:
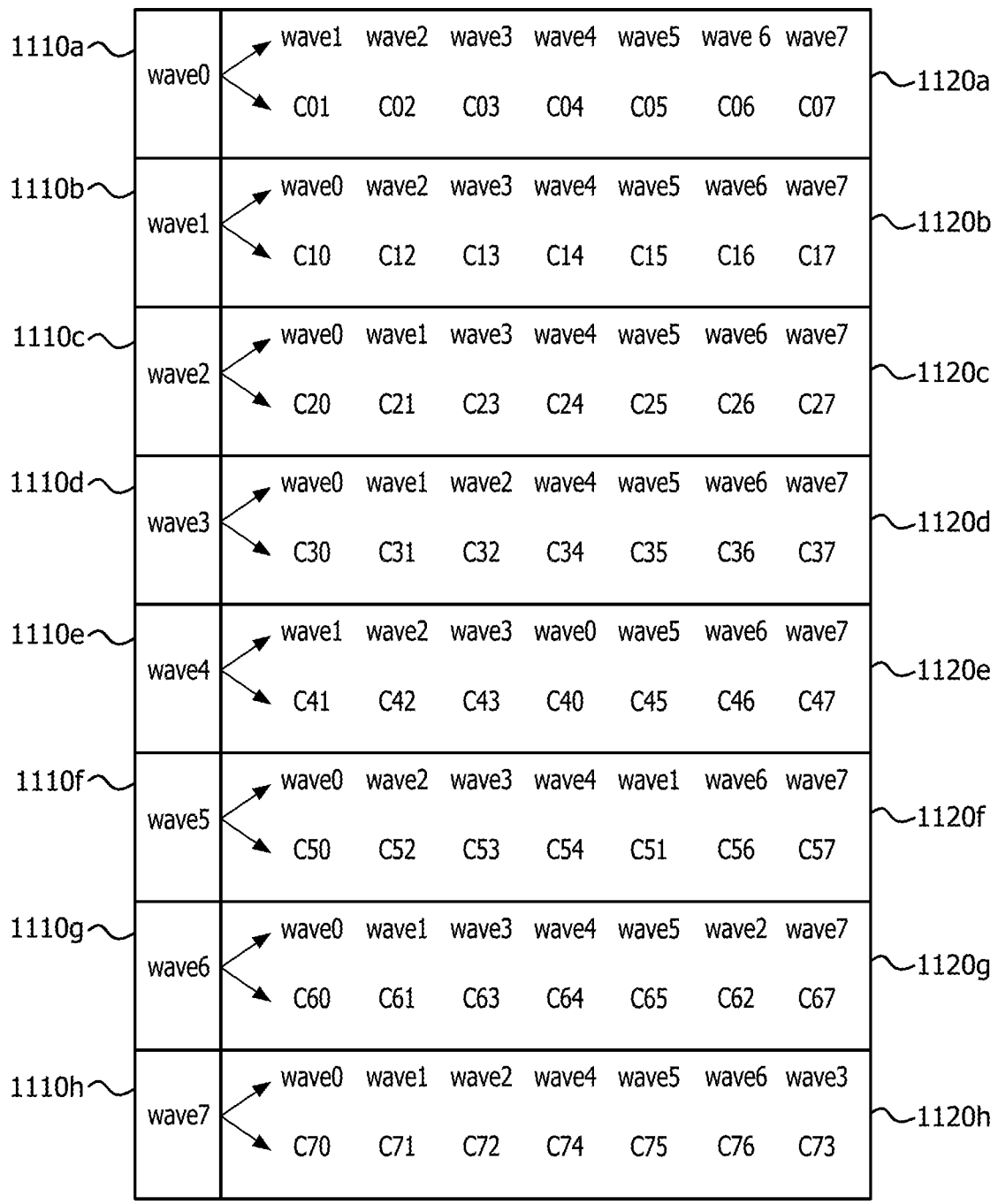
FIG. 11 is a table which illustrates another example state of a correlation array.

FIG. 11 is a table 1100 which illustrates an example state of correlation array 650 at a certain point during the execution of waves wave0, wave1, wave2, wave3, wave4, wave5, wave6, and wave7. The example system 1000 performs scheduling at a granularity of 8 waves. Accordingly, table 1100 includes 8 keys 1110$a$, 1110$b$, 1110$c$, 1110$d$, 1110$e$, 1110$f$, 1110$g$, 1110$h$, which each correspond to one of waves wave0, wave1, wave2, wave3, wave4, waves, wave6, and wave7 respectively.

Each key 1110$a$, 1110$b$, 1110$c$, 1110$d$, 1110$e$, 1110$f$, 1110$g$, 1110$h$ includes a corresponding tag list (not shown) and set of contributing correlation values 1120$a$, 1120$b$, 1120$c$, 1120$d$, 1120$e$, 1120$f$, 1120$g$, 1120$h$. The sets of contributing correlation values 1120$a$, 1120$b$, 1120$c$, 1120$d$, 1120$e$, 1120$f$, 1120$g$, 1120$h$ reflect a correlation of each pair of waves wave0, wave1, wave2, wave3, wave4, wave5, wave6, and wave7. For example, key 1110$a$ stores the set of contributing correlation values 1120$a$ for wave0. The set of contributing correlation values 1120$a$ stores a contributing correlation value C01 corresponding to the correlation between wave0 and wave1, a contributing correlation value C02 corresponding to the correlation between wave0 and wave2, and a contributing correlation value C03, corresponding to the correlation between wave0 and wave3, and so on. Each of the other keys 1110$b$, 1110$c$, 1110$d$, 1110$e$, 1110$f$, 1110$g$, 1110$h$ stores a similar set of contributing correlation values 1120$b$, 1120$c$, 1120$d$, 1120$e$, 1120$f$, 1120$g$, 1120 has reflected in FIG. 11. Before correlation information is available to correlation array 1050 (e.g., similar to step 310 of method 300), the tag list may be empty and the contributing correlation values may be zero.

On a new memory request by CU0, CU1, CU2, or CU3 during execution of a wave, the correlation array 1050 receives the corresponding index and tag information of the memory request from the cache. If the index and tag information matches an entry in table 1100, the corresponding contributing correlation value may be incremented, increased, or otherwise altered to reflect the increased correlation. For example, if correlation array 1050 receives index wave1 and a tag tag3, and if correlation array 1050 reflects that the tag list of wave0 also includes tag3, then the contributing correlation value C01, which reflects the correlation between wave0 and wave1, may be increased (e.g., incremented by one).

If the received index matches a key in table 1100, but the received tag does not match any tags in the tag list, the received tag may be inserted into the tag list for that key. If the received index does not match a key in table 1100, but the received tag does match a tag in the tag list a new key may be added for that index and the correlations for the other keys may be adjusted if the tag matches.

After wave0, wave1, wave2, wave3, wave4, wave5, wave6, and wave7 have finished execution on CU0, CU1, CU2, and CU3, contributing correlation values C01 and C10 may be summed (or otherwise combined) to determine a correlation value c01 reflecting the correlation between wave0 and wave1. Other matching contributing correlation values may also be summed similarly to find correlation values for other thread pairs. For example, c02 may be a correlation value for wave0 and wave2, calculated by summing contributing correlation values C02 and C20, and so forth. These correlation values c01, c02, c03, c04, c05, c06, c07, c12, c13, c14, c15, c16, c17, c23, c24, c25, c26, c27, c34, c35, c36, c37, c45, c46, c47, c56, c57, c67 may be reported to decision unit 660.

It is noted that rather than waiting until waves wave0, wave1, wave2, wave3, wave4, wave5, wave6, and wave7 have finished execution on CU0, CU1, CU2, and CU3, the contributing correlation values may be summed and/or reported after a certain interval, e.g., 1,000 processor clock cycles. Thus, the correlation values may be calculated prior to the completion of execution, or after several executions of CU0, CU1, CU2, and CU3. This may permit dynamic scheduling and/or scheduling based on higher resolution data.

Returning to FIG. 1000, the decision unit 1060 may determine the issuing order (i.e., the data-driven schedule) of the next eight waves wave0, wave1, wave2, wave3, wave4, wave5, wave6, and wave7 based on the reported correlation values c01, c02, c03, c04, c05, c06, c07, c12, c13, c14, c15, c16, c17, c23, c24, c25, c26, c27, c34, c35, c36, c37, c45, c46, c47, c56, c57, c67 Table 4 shows an example of a partial algorithm for decision unit 1060 to make this determination. Wave dispatcher 1040 receives the data-driven schedule from the decision unit 1060, and dispatches the threads to CU0, CU1, CU2, and CU3 according to the data-driven schedule. In some implementations, wave dispatcher 1040 may only update its schedule on a determination that the schedule has changed. In some implementations, on a condition that the schedule has changed, the thread groups currently running on CU0, CU1, CU2, and CU3 may be preempted and the context may be saved, the updated schedule may be applied to the waves (i.e., waves may be reassigned to different compute units and/or execution times), the context may be restored, and execution may resume under the updated schedule.

TABLE 4

For 8 waves and 4 CUs:

1: For wave X (X = 0-7)
2: calculate correlation of wave X with each other thread to obtain the thread Y with the highest correlation to wave X.
3: calculate a three-variable correlation among wave X, wave Y, and each other wave to determine the wave Z having the highest correlation to X and Y.
4: calculate a four-variable correlation among wave X, wave Y, wave Z, and each other wave to determine the wave A having the highest correlation to X, Y, and Z.
5: schedule waves X, Y, Z, A onto CUs 0, 1, 2, 3 respectively to run in parallel.
5a: optionally, determine the value of X resulting in the highest 4-variable correlation and schedule waves X, Y, Z, A onto CUs
0, 1, 2, 3 respectively to run in parallel based on that value of X.

It is noted that for any of these or other implementations, the data driven scheduler may be clock gated, power gated, or subject to a different suitable power saving mechanism, e.g., when it is idle. A data driven scheduler may remain idle until a new shader is executed, for example.

It is further noted that for any of these or other implementations, the tag list may be sorted in ascending or descending order, e.g., to facilitate search, and may be compressed or uncompressed.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for data driven scheduling of a plurality of computing cores of a processor, the method comprising:
    executing a plurality of threads on the plurality of computing cores, according to a default schedule;
    analyzing the plurality of threads, based on the execution according to the default schedule, to determine correlated threads among the plurality of threads, wherein the threads are determined to be correlated based on whether they access the same information from a memory or access the same reference from the memory, and based on a maximum correlation among the plurality of threads;
    generating a data driven schedule wherein each of the correlated threads are scheduled for execution on a different computing core of the plurality of computing cores based on the data driven schedule in an order which provides a highest average correlation of the plurality of threads; and
    executing the plurality of threads on the plurality of computing cores according to the data driven schedule.

2. The method of claim 1, wherein the correlated threads are correlated based on memory re-use among subsets of the plurality of threads.

3. The method of claim 1, wherein the correlated threads are correlated based on locality of reference among subsets of the plurality of threads.

4. The method of claim 1, wherein the default schedule comprises a round-robin schedule.

5. The method of claim 1, wherein analyzing the plurality of threads to determine the correlated threads comprises:
    receiving, by data-driven scheduling circuitry, information regarding memory accesses by the computing cores due to execution of at least a portion of the plurality of threads on the computing cores; and deriving the correlated threads based on the information.

6. The method of claim 5, wherein the memory is shared among the plurality of computing cores.

7. The method of claim 5, wherein the memory comprises a cache memory.

8. The method of claim 1, wherein the plurality of threads comprises a plurality of waves, and the plurality of threads are scheduled on a wave basis.

9. The method of claim 1, wherein the plurality of threads comprises a plurality of warps, and the plurality of threads are scheduled on a warp basis.

10. The method of claim 1, wherein the plurality of threads comprises a plurality of thread groups, and the plurality of threads are scheduled on a thread group basis.

11. The method of claim 1, wherein the data driven schedule is generated after each of the plurality of threads has completed execution on the computing cores.

12. The method of claim 1, wherein the data driven schedule is generated after execution of the plurality of threads on the computing cores has proceeded for a period of time.

13. The method of claim 1, wherein the data driven schedule is generated before all of the plurality of threads have completed execution on the computing cores.

14. The method of claim 1, further comprising:
analyzing the plurality of threads, based on the execution according to the data driven schedule, to determine updated correlations among the plurality of threads;
generating an updated data driven schedule based on the updated correlations; and
executing the plurality of threads on the plurality of computing cores according to the updated data driven schedule.

15. The method of claim 1, further comprising:
determining whether the data driven schedule is different from the default schedule; and
if the data driven schedule is different from the default schedule:
preempting execution of the computing cores,
saving a current context, and
dispatching the plurality of threads according to the data driven schedule.

16. The method of claim 14, further comprising:
determining whether the updated data driven schedule is different from the data driven schedule; and
if the updated data driven schedule is different from the data driven schedule:
preempting execution of the computing cores,
saving a current context, and
dispatching the plurality of threads according to the updated data driven schedule.

17. The method of claim 1, wherein the computing cores each comprise a compute unit, a single-instruction-multiple-data (SIMD) unit, and/or a shader engine.

18. A processor configured for data-driven scheduling, comprising:
a plurality of computing cores;
a memory shared by each of the plurality of computing cores;
dispatching circuitry configured to dispatch a plurality of threads to execute on the plurality of computing cores, according to a default schedule;
correlation circuitry configured to analyze the plurality of threads, based on the execution according to the default schedule, to determine correlated threads among the plurality of threads, wherein the threads are determined to be correlated based on whether they access the same information from memory or access the same reference from memory, and based on a maximum correlation among the plurality of threads; and
scheduling circuitry configured to determine a data driven schedule wherein each of the correlated threads are scheduled for execution on a different computing core of the plurality of computing cores based on the data driven schedule in an order which provides a highest average correlation of the plurality of threads;
wherein the dispatching circuitry is further configured to dispatch the plurality of threads to execute on the plurality of computing cores according to the data driven schedule.

19. The processor of claim 18, wherein the correlation circuitry is configured to determine the correlated threads based on memory re-use among subsets of the plurality of threads.

20. The processor of claim 18, wherein the correlation circuitry is configured to determine the correlated threads based on locality of reference among subsets of the plurality of threads.

21. The processor of claim 18, wherein the default schedule comprises a round-robin schedule.

22. The processor of claim 18, where in the correlation circuitry is further configured to:
receive information regarding memory accesses by the computing cores due to execution of at least a portion of the plurality of threads on the computing cores; and
derive the correlated threads based on the information.

23. The processor of claim 22, wherein the memory is shared among the plurality of computing cores.

24. The processor of claim 22, wherein the memory comprises a cache memory.

25. The processor of claim 18, wherein the plurality of threads comprises a plurality of waves, and the plurality of threads are scheduled on a wave basis.

26. The processor of claim 18, wherein the plurality of threads comprises a plurality of warps, and the plurality of threads are scheduled on a warp basis.

27. The processor of claim 18, wherein the plurality of threads comprises a plurality of thread groups, and the plurality of threads are scheduled on a thread group basis.

28. The processor of claim 18, wherein the scheduling circuitry is further configured to generate the data driven schedule after each of the plurality of threads has completed execution on the computing cores.

29. The processor of claim 18, wherein the scheduling circuitry is further configured to generate the data driven schedule after execution of the plurality of threads on the computing cores has proceeded for a period of time.

30. The processor of claim 18, wherein the scheduling circuitry is further configured to generate the data driven schedule before all of the plurality of threads have completed execution on the computing cores.

31. The processor of claim 18, wherein the correlation circuitry is further configured to:
analyze the plurality of threads, based on the execution according to the data driven schedule, to determine updated correlations among the plurality of threads;
generate an updated data driven schedule based on the updated correlations; and
wherein the dispatching circuitry is further configured to dispatch the plurality of threads to execute on the plurality of computing cores according to the updated data driven schedule.

32. The processor of claim 18, wherein the processor comprises circuitry further configured to:
  determine whether the data driven schedule is different from the default schedule; and
  if the data driven schedule is different from the default schedule:
    preempt execution of the computing cores,
    save a current context, and
    dispatch the plurality of threads according to the data driven schedule.

33. The processor of claim 31, wherein the processor comprises circuitry further configured to:
  determine whether the updated data driven schedule is different from the data driven schedule; and
  if the updated data driven schedule is different from the data driven schedule:
    preempt execution of the computing cores,
    save a current context, and
    dispatch the plurality of threads according to the updated data driven schedule.

34. The processor of claim 18, wherein the computing cores each comprise a compute unit, a single-instruction-multiple-data (SIMD) unit, and/or a shader engine.

35. A system for memory management of a multicore processor, the system comprising:
  a processor comprising:
    a plurality computing cores;
    a memory shared by each of the plurality of computing cores;
    dispatching circuitry configured to dispatch a plurality of threads to execute on the plurality of computing cores, according to a default schedule;
    correlation circuitry configured to analyze the plurality of threads, based on the execution according to the default schedule, to determine correlated threads among the plurality of threads, wherein the threads are determined to be correlated based on whether they access the same information from memory or access the same reference from memory, and based on a maximum correlation among the plurality of threads; and
    scheduling circuitry configured to determine a data driven schedule wherein each of the correlated threads are scheduled for execution on a different computing core of the plurality of computing cores based on the data driven schedule in an order which provides a highest average correlation of the plurality of threads;
    wherein the dispatching circuitry is further configured to dispatch the plurality of threads to execute on the plurality of computing cores according to the data driven schedule.

36. The system of claim 35, wherein the correlation circuitry is configured to determine the correlated threads based on memory re-use among subsets of the plurality of threads.

37. The system of claim 35, wherein the correlation circuitry is configured to determine the correlated threads based on locality of reference among subsets of the plurality of threads.

38. The system of claim 35, wherein the default schedule comprises a round-robin schedule.

39. The system of claim 35, where in the correlation circuitry is further configured to:
  receive information regarding memory accesses by the computing cores due to execution of at least a portion of the plurality of threads on the computing cores; and
  derive the correlated threads based on the information.

40. The system of claim 39, wherein the memory is shared among the plurality of computing cores.

41. The system of claim 39, wherein the memory comprises a cache memory.

42. The system of claim 35, wherein the plurality of threads comprises a plurality of waves, and the plurality of threads are scheduled on a wave basis.

43. The system of claim 35, wherein the plurality of threads comprises a plurality of warps, and the plurality of threads are scheduled on a warp basis.

44. The system of claim 35, wherein the plurality of threads comprises a plurality of thread groups, and the plurality of threads are scheduled on a thread group basis.

45. The system of claim 35, wherein the scheduling circuitry is further configured to generate the data driven schedule after each of the plurality of threads has completed execution on the computing cores.

46. The system of claim 35, wherein the scheduling circuitry is further configured to generate the data driven schedule after execution of the plurality of threads on the computing cores has proceeded for a period of time.

47. The system of claim 35, wherein the scheduling circuitry is further configured to generate the data driven schedule before all of the plurality of threads have completed execution on the computing cores.

48. The system of claim 35, wherein the correlation circuitry is further configured to:
  analyze the plurality of threads, based on the execution according to the data driven schedule, to determine updated correlations among the plurality of threads;
  generate an updated data driven schedule based on the updated correlations; and
  wherein the dispatching circuitry is further configured to dispatch the plurality of threads to execute on the plurality of computing cores according to the updated data driven schedule.

49. The system of claim 35, wherein the processor comprises circuitry further configured to:
  determine whether the data driven schedule is different from the default schedule; and
  if the data driven schedule is different from the default schedule:
    preempt execution of the computing cores,
    save a current context, and
    dispatch the plurality of threads according to the data driven schedule.

50. The system of claim 48, wherein the processor comprises circuitry further configured to:
  determine whether the updated data driven schedule is different from the data driven schedule; and
  if the updated data driven schedule is different from the data driven schedule:
    preempt execution of the computing cores,
    save a current context, and
    dispatch the plurality of threads according to the updated data driven schedule.

51. The system of claim 35, wherein the computing cores each comprise a compute unit, a single-instruction-multiple-data (SIMD) unit, and/or a shader engine.

* * * * *